United States Patent

[11] 3,622,840

| [72] | Inventor | Robert D. Kahn |
| | | Rockville Centre, Long Island, N.Y. |
| [21] | Appl. No. | 13,441 |
| [22] | Filed | Feb. 24, 1970 |
| [45] | Patented | Nov. 23, 1971 |
| [73] | Assignee | Fedtro, Inc. |
| | | Rockville Centre, N.Y. |

[54] MULTIPLE OUTLET STRUCTURE
1 Claim, 6 Drawing Figs.

[52] U.S. Cl. .................................................. 317/114, 317/120, 337/197
[51] Int. Cl. .................................................. H02b 1/04, H02b 11/18
[50] Field of Search .......................................... 200/51 LM, 167 A, 167 R; 317/99, 112, 114, 116, 119, 120; 337/186, 187, 194, 197, 198

[56] References Cited

UNITED STATES PATENTS

| 2,103,069 | 12/1937 | Frank | 317/119 |
| 2,506,212 | 5/1950 | Grohsgal | 317/99 X |
| 2,536,520 | 1/1951 | Tighe | 337/197 |
| 2,778,957 | 1/1957 | Fuchs | 317/119 X |
| 3,154,722 | 10/1964 | Cole | 317/114 |
| 3,229,066 | 1/1966 | Rowe | 337/197 X |
| 3,432,789 | 3/1969 | Poehlman | 337/186 X |
| 3,437,881 | 4/1969 | Paganelli | 317/99 |

OTHER REFERENCES
Lafayette Radio Electronics, 1965 Catalog No. 650, pg. 358

*Primary Examiner*—Lewis H. Myers
*Assistant Examiner*—Gerald P. Tolin
*Attorney*—Amster & Rothstein

ABSTRACT: An electrical outlet control unit comprising a plurality of individual electric outlets, each of said outlets including its own switch and indicating lamp, the outlets being wired in parallel via a master switch and fuse to a source of power. The individual electric outlets are characterized by being self-contained assemblies which are mounted within the outlet control unit housing to resist shock.

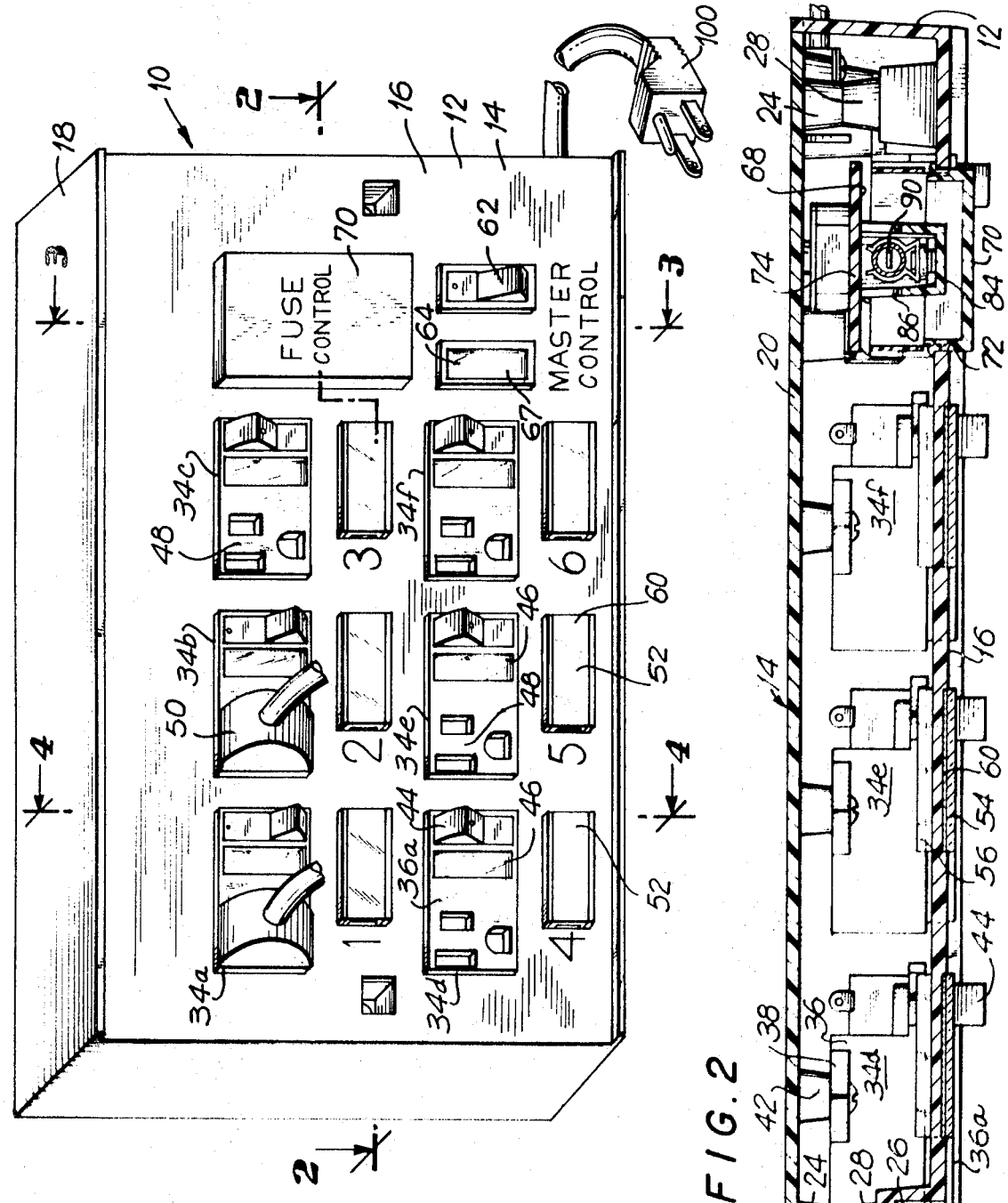
FIG. 1
FIG. 2
INVENTOR.
ROBERT D. KAHN
ATTORNEYS

PATENTED NOV 23 1971 3,622,840

INVENTOR
ROBERT D. KAHN

BY
*Amster & Rothstein*
ATTORNEYS

MULTIPLE OUTLET STRUCTURE

ELECTRIC OUTLET CONTROL UNIT

The present invention relates to an electric outlet control unit.

It is the primary object of the present invention to provide an electric outlet control unit which comprises a plurality of individual electric outlets, each of said outlets including its own switch and indicating lamp, said outlets being wired in parallel through a master switch and a fuse to a source of power.

It is a further object of the present invention to provide an electric outlet control unit of the character described wherein each of the outlets is a self-contained unit and is mounted within the housing of the electric outlet control unit on a common wall so as to resist shock and wear.

It is a further object of the present invention to provide an electric outlet control unit of the character described which includes a hand-operable fuse assembly constructed so that the circuit of the control unit must be opened before the fuse itself can be changed, thereby preventing the application of shock to the fingers of a user, when the user is changing the fuse.

In general, and in accordance with the teaching of the present invention, there is provided an electric outlet control unit comprising a plurality of individual electric outlets, said outlets being generally wired in parallel. Each of the individual electric outlets is generally both mechanically and electrically identical and includes a plug receptacle, an on/off switch and an indicating lamp. A master switch and fuse are also provided as part of the control unit, to control the supply of power to the individual electric outlets as a group. The electric outlets have their own individual housings, so that they are self-contained assemblies. Each of these housings is mounted via lugs on a common wall of the electric outlet control unit so as to prevent shock or other abuse from damaging the outlets themselves. The electric outlet control unit has a fuse assembly which includes a fuse member with a pair of male prongs and a fuse electrically connected across the prongs. When the fuse assembly is removed from the outlet control unit, the circuit of the control unit is opened. Only when the fuse member is removed can the fuse itself be removed and replaced. Hence, there are no live outlets or contacts which may be touched by the fingers of a user, when he is changing the fuse.

The above brief description, as well as further objects, features and advantages of the present invention, will be more fully appreciated by reference to the following detailed description of a presently preferred, but nonetheless illustrative embodiment, in accordance with the present invention, when taken in conjunction with the accompanying drawings wherein:

FIG. 1 is a front view of the electric outlet control unit;

FIG. 2 is a cross-sectional view of the electric outlet control unit, taken substantially along the line 2—2 of FIG. 1;

Figure 4:
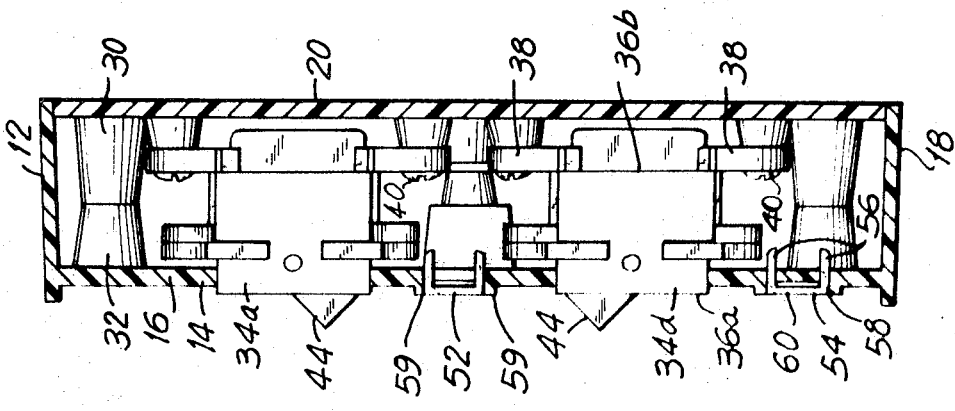
FIG. 3 and FIG. 4 are both cross-sectional views of the electric outlet control unit, taken substantially along the lines 3—3 and 4—4 of FIG. 1 respectively.

Referring now in detail to the drawings, an outlet control unit 10 is provided, the various components of which are retained within a housing 12. Generally speaking, the control unit 10 is of the type which may be utilized wherever it is desired to connect a number of electrical appliances to a central station. The housing includes a cover 14 which has a front wall 16 and four sidewalls 18, the sidewalls 18 and the front wall 16 being formed in one piece. The housing 12 is completed by a floor 20, upon which most of the components of the electric outlet control unit 10 are mounted. The cover 14 is removably attached to the floor 20 by bolts 22 which pass through inwardly protruding hollow legs 24 which rise from the floor 20, the bolts 22 engaging nuts 26 which are situated in hollow legs 28 which protrude inwardly from the front wall 16. The faces of the legs 24 and the legs 28 contact to fix the location of the floor 20 with respect to the front wall 16. In addition, the floor 20 has a number of columns 30 rising therefrom, which meet with similar columns 32 protruding from the front wall 16. These columns also position the front wall 16 with respect to the floor 20.

In general terms, the electric outlet control unit 10 comprises a plurality of electric outlets, all of which are connected in parallel and which as a whole are controlled by a master switch. In the present embodiment of the electric outlet control unit 10, six such outlets are shown, 34a, 34b, 34c, 34d, 34e and 34f. (See FIG. 1) All of these outlets are substantially mechanically and electrically identical, and only one, outlet 34d, will be described in detail. The outlet 34d (see FIGS. 1, 2 and 4) is a self-contained unit, having its own individual housing 36, which includes front and backwalls and four sidewalls. As best seen in FIGS. 1 and 2, the front wall 36a of the outlet housing extends through and is raised slightly above the front wall 16 of the cover housing 12. The lower portions of the sidewalls of the outlet housing 36 have a pair of oppositely disposed lugs 38 extending therefrom, and screws 40 fix these lugs 39 to inwardly protruding posts 42 extending from the floor 20. Thereby, each individual outlet 34 is mounted via two lugs 38 which are fixed to posts 42 on the floor 20 of the control unit, which structure enables the electric outlets to resist shock and accept a considerable amount of abuse which may be rendered to the control unit. This ability is enhanced by the fact that each of the outlets is substantially entirely encased in its own housing.

Each electric outlet 34 includes a hand operable rocker-type on/off switch 44, which is connected with an indicating lamp 46. The outlet has a plug receptacle 48, desirably, as illustrated, of the three-prong type and, as illustrated in FIG. 1, a three-prong plug 50 can be received in each of said receptacles 48. The switch 44 and indicating lamp 46 of each outlet 34 are integrated in and situated in the housing 36 of that outlet to form a self-contained assembly.

Each of the outlets 34 is associated with an identity panel 52, there being one such panel located adjacent to each outlet. Each of said panels 52 includes a channel-shaped elongated transparent window 54, and two parallel legs 56 of the window 54 passing through parallel slots 58 formed for that purpose in the front wall 16. A pair of ribs 59 locate each window 54, said ribs rising from the front wall 16. Between the window 54 and that portion of the front wall 16 between the slots 58, is formed a relatively narrow passage into which a rectangular piece of paper 60 or the like may be inserted and on this paper 60 may be written appropriate identifying indicia. To label any outlet 34, the window 54 is removed from the wall 16, the paper 60 has indicia placed thereon, and then the window is replaced.

The outlet control unit 10 further includes a master on/off switch 62 of the rocker type which controls the supply of power to all of the individual outlets 34 as a group. An indicating lamp 64 is electrically connected with the master switch 62, indicating when the master switch 62 is in the "on" position. As is conventional, the lamp 64 includes a bulb 65 situated beneath a lens 67.

Figure 3:
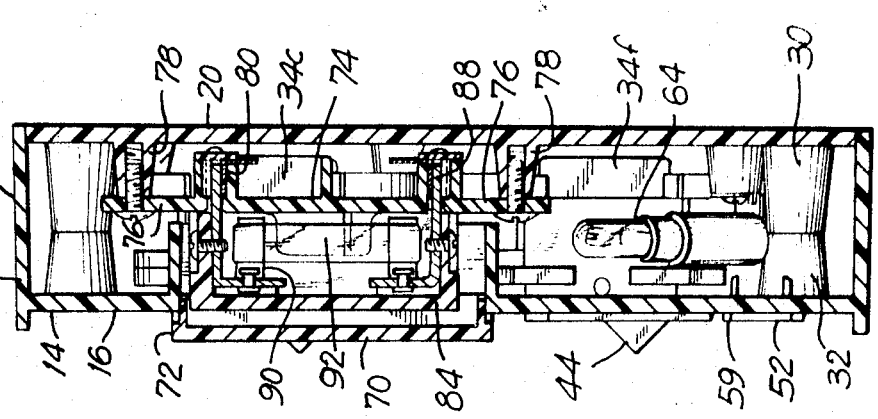
Figure 6:
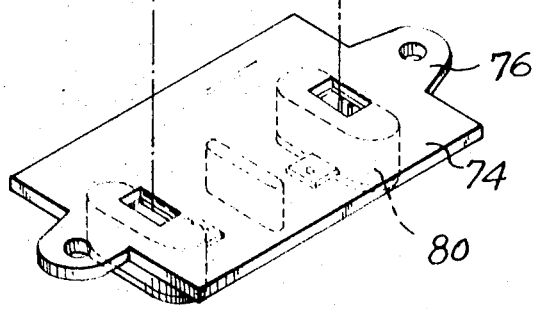
FIG. 6 is an exploded view of the fuse assembly of the electric outlet control unit.

A fuse assembly 66 (see FIG. 6) operates as a fuse for the entire electric outlet control unit 10. The fuse assembly 66 is situated in a well 68 in the interior of the unit 10, and under normal conditions the fuse assembly 66 has a cover 70 over it. The cover 70 has depending sidewalls 72 which engage the opposing edges of a rectangular aperture in the front wall 16 so as to be removably retained in place. The fuse assembly 66 includes a platform 74 which is mounted via screws which pass through lugs 76 protruding from the platform 74 into columns 78 (FIG. 3) which rise from the floor 20.

The fuse assembly 66 further includes a fuse body 82 which includes a channel-shaped member 84 with closed ends 84a. The body has a pair of thumbnail slots 86 formed on opposite sides of the longer sidewalls of said member 84. Within the member 84 are housed a pair of male prongs 88, the prongs being fixed in place by screws which pass through the end walls 84a of the channel-shaped member 84. A pair of fuse clips 90 is also situated within the member 84 and each clip 90 (see FIGS. 2 and 3) is electrically connected to a different prong 88, and as is conventional, the clips are formed to receive a cylindrical automotive-type fuse 92. A pair of prong receptacles 80 is situated underneath the platform 74, to engage the prongs 88. When the fuse 92 is in place and the prongs 88 inserted into the receptacles 80, electrical power may be supplied to the outlets 34, and when overheating takes place as by a short circuit, the fuse 92 will "blow," cutting the flow of power to the outlets 34.

It should be noted that the fuse assembly 66 is adapted to promote electrical safety. Once the cover 70 is removed, and when a user desires to change a fuse, first the member 84 must be pulled away from the platform 74. Only when the member 84 is so removed, thereby opening the control unit circuit, can the fuse 92 itself be removed from the clips 90 situated within the member 84. Thus, there is no possibility that the fingers of the user will be exposed to hot contacts, since by the very act of removing the member 84, the prongs 88 are removed from the receptacles 80, thereby opening the circuit line. Since the fuse 92 can only be replaced after the line is open, there is no possibility of the user suffering a shock.

Figure 5:
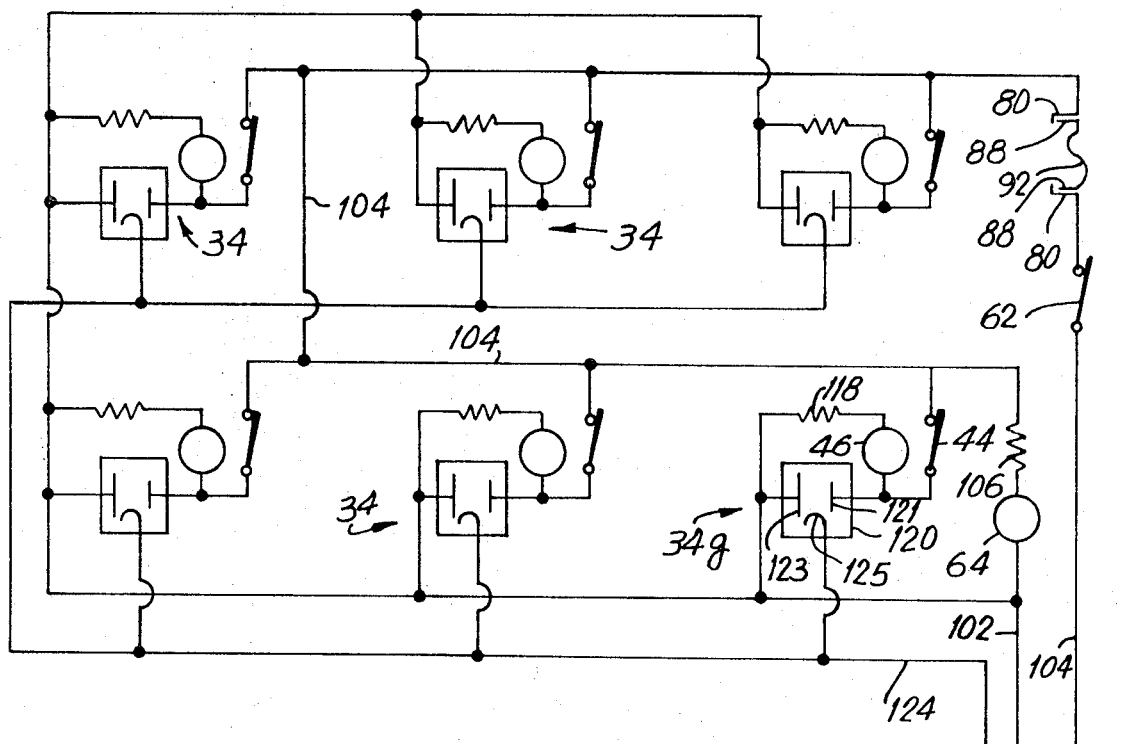
FIG. 5 is a circuit diagram of the electric outlet control unit.

The circuit diagram for the outlet control unit 10 is illustrated in FIG. 5. The circuit includes a plug 100, shown symbolically in FIG. 5, which desirably is of the three-prong type. From the plug 100 a pair of busses 102, 104 extend, and included in the bus 104 is the on/off master switch 62 and the fuse assembly 92. Contacts 88 are electrically connected to fuse assembly and these contacts removably mate with contacts 80 in the bus 104. A plurality of outlets 34 are situated in the circuit of FIG. 5, and all of the outlets are essentially electrically identical. Further, all of the outlets 34 are connected in parallel across the busses 102, 104. Referring as a typical example to outlet 34g, the switch 44 of said outlet is connected between bus 104 and contact 121 in the receptacle 120. Contact 123 in the receptacle 120 is connected to bus 102. The indicating lamp 46 and a current-limiting resistor 118 are connected in parallel with the two contacts 120, 123. Accordingly, when the switch 44 is closed, line current can flow through an electrical appliance connected across contacts 120, 123. With the closure of the switch 44, current also flows through lamp 46 to indicate that the receptacle 120 is live and ready to supply power to an electrical appliance. The master switch 62 controls the supply of power to all of the outlets 34, and a master indicating lamp 64 and its current-limiting resistor 106 are connected across the busses 102, 104, so that when the switch 62 is closed, the lamp 64 lights. Desirably, a ground line 124 connects the grounded terminal of the plug 100 to the ground contact 125 of all of the receptacles 34 in a conventional manner.

A latitude of modification, change, and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. An electric outlet control unit for providing individual and collective control of a plurality of electrical receptacles and an indication of the use thereof comprising in combination a master switch, a master-indicating lamp, transparent identification channel-shaped members, circuit means, and a plurality of electric outlet housings, each of said outlet housings including an electrical outlet receptacle, an outlet switch, an outlet indicator lamp, each of said outlet switches being connected to control current flow from said circuit means to said master lamp and each of said outlet receptacles, and mounting means for each outlet housing, including mounting screws, said circuit means electrically connecting each of said outlet receptacles with receptacles of other outlet housings in a parallel connection and connecting each of said receptacles to said master switch and said master indicating lamps and said mounting means further including a pair of sidewalls for each outlet housing, oppositely disposed lugs extending each from one of said sidewalls and defining screw holes therethrough and each of said outlet housings further including a top wall defining exposure openings for each of said outlet receptacles, each of said outlet switches and each of said outlet indicator lamps, said control unit further comprising in combination a generally rectangular unit housing including front and backwalls; a bottom wall, sidewalls and a means for removing said front and sidewalls from said backwall, said bottom wall including mounting posts extending upwardly, defining vertically oriented threaded mounting openings, and corresponding in position to the position of said screw holes such that mounting of each of said outlet housings is provided by insertion of said mounting screws through said screw holes and into said threaded mounting openings thereby raising each of said outlet housings from said bottom wall, isolating each of said outlet housings from each other and from the bottom wall to which they are mounted, and said front wall defining outlet housing exposure openings for exposing said outlet housing top walls and further defining identification channel-shaped member attachment openings attaching said channel-shaped members, and said control unit further comprising in combination a fuse assembly, said fuse assembly including a fuse, a member electrically connecting said fuse in series in said circuit means, means removably connecting said member to said circuit means and means removably retaining said fuse within said member.

* * * * *